(12) United States Patent
Yadav et al.

(10) Patent No.: US 8,364,644 B1
(45) Date of Patent: Jan. 29, 2013

(54) EXCLUSION OF DATA FROM A PERSISTENT POINT-IN-TIME IMAGE

(75) Inventors: Sandeep Yadav, Santa Clara, CA (US); Subramaniam V. Periyagaram, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 391 days.

(21) Appl. No.: 12/428,396

(22) Filed: Apr. 22, 2009

(51) Int. Cl.
G06F 17/30 (2006.01)
(52) U.S. Cl. .................................... 707/649; 707/697
(58) Field of Classification Search ............. 707/202, 707/705, 203, 697, 694, 823; 706/12, 45; 711/162, 141
See application file for complete search history.

(56) References Cited

U.S. PATENT DOCUMENTS

| | | | | |
|---|---|---|---|---|
| 6,141,765 A * | 10/2000 | Sherman | ................ | 713/400 |
| 6,490,596 B1 * | 12/2002 | Micka | ................ | 1/1 |
| 6,732,124 B1 * | 5/2004 | Koseki et al. | ................ | 1/1 |
| 6,917,929 B2 * | 7/2005 | Teloh et al. | ................ | 1/1 |
| 7,072,916 B1 * | 7/2006 | Lewis et al. | ................ | 1/1 |
| 7,124,128 B2 * | 10/2006 | Springer et al. | ................ | 1/1 |
| 7,302,515 B1 * | 11/2007 | Detlefs | ................ | 711/6 |
| 7,313,557 B1 * | 12/2007 | Noveck | ................ | 1/1 |
| 7,376,796 B2 * | 5/2008 | Corbett et al. | ................ | 711/141 |
| 7,424,497 B1 * | 9/2008 | Leverett et al. | ................ | 1/1 |
| 7,603,551 B2 * | 10/2009 | McGrath et al. | ................ | 713/164 |
| 7,680,996 B2 * | 3/2010 | Komarov et al. | ................ | 711/162 |
| 7,685,083 B2 * | 3/2010 | Fairweather | ................ | 706/45 |
| 7,739,318 B2 * | 6/2010 | Zayas et al. | ................ | 707/823 |
| 7,783,615 B1 * | 8/2010 | Compton et al. | ................ | 707/694 |
| 7,822,933 B1 * | 10/2010 | Sontakke et al. | ................ | 711/162 |
| 7,873,619 B1 * | 1/2011 | Faibish et al. | ................ | 707/705 |
| 8,078,637 B1 * | 12/2011 | Polyudov | ................ | 707/791 |
| 2004/0083345 A1 * | 4/2004 | Kim et al. | ................ | 711/162 |
| 2006/0101071 A1 * | 5/2006 | Henderson | ................ | 707/104.1 |
| 2006/0123211 A1 * | 6/2006 | Derk et al. | ................ | 711/162 |
| 2006/0235811 A1 * | 10/2006 | Fairweather | ................ | 706/12 |
| 2009/0006792 A1 * | 1/2009 | Federwisch et al. | ................ | 711/162 |
| 2010/0049742 A1 * | 2/2010 | Raven et al. | ................ | 707/104.1 |

* cited by examiner

*Primary Examiner* — James Trujillo
*Assistant Examiner* — Thong Vu
(74) *Attorney, Agent, or Firm* — Blakely, Sokoloff, Taylor & Zafman LLP (57) ABSTRACT

A data set on a physical storage device is associated with an active bitmap and a persistent point-in-time image (PPI) exclusion bitmap, where each bit in the bitmaps is associated with a data block in the data set. The active bitmap and the PPI exclusion bitmap are used to determine which of the data blocks in the data set are to be included in a PPI of the data set.

18 Claims, 8 Drawing Sheets

EXCLUSION OF DATA FROM A PERSISTENT POINT-IN-TIME IMAGE

FIELD OF INVENTION

The present invention relates to storage systems, and more particularly, to exclusion of data from a backup image in a storage server.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2009, NetApp, Inc., All Rights Reserved.

BACKGROUND

A network data storage system typically includes storage devices and one or more network storage servers or storage appliances. A storage server may provide services related to the organization of data on storage devices, such as disks. Some of these storage servers are commonly referred to as filers or file servers. The storage server may be implemented with a special-purpose computer or a general-purpose computer. Such storage systems typically use file systems to organize and provide easy access to the files they contain.

The storage server is a processing system configured to store and retrieve data on behalf of one or more client processing systems ("clients"). In the context of Network Attached Storage (NAS), a storage server may be a filer, which operates on behalf of one or more clients to store and manage shared files in a set of mass storage devices, such as magnetic or optical disks or tapes. The mass storage devices may be organized into one or more volumes of a Redundant Array of Inexpensive Disks (RAID).

A storage server may create backup images of data in the mass storage devices. For example, the storage server may periodically create backup images for volumes in a RAID and retain these images so that historical versions of files and other data can be restored from the backup images. One example of this is a persistent point-in-time image (PPI). The duration of time between these backups may be configurable by a user. For instance, a user or administrator of the storage system may configure the storage system to create backup images daily or weekly. When thus configured, the storage system creates the backup images accordingly, without further action by the user. The storage server may conserve storage space by performing an incremental backup process, where only data that has changed since the creation of the last backup image is included in a new backup image.

The storage devices often contain temporary files, system files, file system metadata, or other data that does not need to be included in a backup image. In addition, some of these files or data may change frequently. For example, certain system files may be updated every time a particular routine process is executed. Thus, when an incremental backup image is created, such routinely changing files will likely be included in the incremental backup image, consuming unnecessary space at each backup operation.

In many cases, the unwanted data cannot simply be deleted from the backup image after the image is created, particularly if a high confidence level in the integrity of the backup images must be maintained.

Thus, the inclusion of the unwanted data and files in backup images can result in a significant consumption of storage space over the course of many backup operations, particularly if the backup operations are performed periodically.

SUMMARY OR THE INVENTION

A data set on a physical storage device is associated with an active bitmap and a persistent point-in-time image (PPI) exclusion bitmap, where each bit in the bitmaps is associated with a data block in the data set. The active bitmap and the PPI exclusion bitmap are used to determine which of the data blocks in the data set are to be included in a PPI of the data set.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

One embodiment of a storage server in a data storage system has the ability to generate a persistent, read-only, point-in-time image of data set, such as a volume, file, or logical unit number (LUN). Such a persistent point-in-time image (PPI) may also be referred to as a backup image, or a snapshot. A PPI captures the state of data in a data set at the point in time that the PPI was created. This allows the state of the data set to be restored from the PPI in the event of for example, a catastrophic failure of the storage system or corruption of data. The ability to restore data from a PPI provides administrators of the data storage system with a simple mechanism to revert the state of the data set to a known previous state in time as captured by the PPI. In one embodiment, creation of a PPI or restoring a data set from a PPI can be controlled from a client-side software tool, such as SnapDrive™ or SnapManager® for Microsoft® Exchange, both made by NetApp.

In one embodiment, a process for creating a PPI operates on a data set that includes a number of data blocks. A data set may be any collection or logical container for data, and may be, for example, a logical unit number (LUN) or a volume. A PPI may also be considered a data set. Each of the data blocks in the data set is allocated to a file, and thus contains data for that file, or is unallocated. Unallocated data blocks typically do not contain important data and are not included in the PPI image.

To facilitate description, it is henceforth assumed that the data set that is backed up by a PPI is a LUN, where any particular volume in a data storage system may include one or more LUNs. It will be recognized, however, that essentially the same technique introduced herein could be used to back up other containers of data to a PPI, such as a file, a volume, etc.

Figure 1:
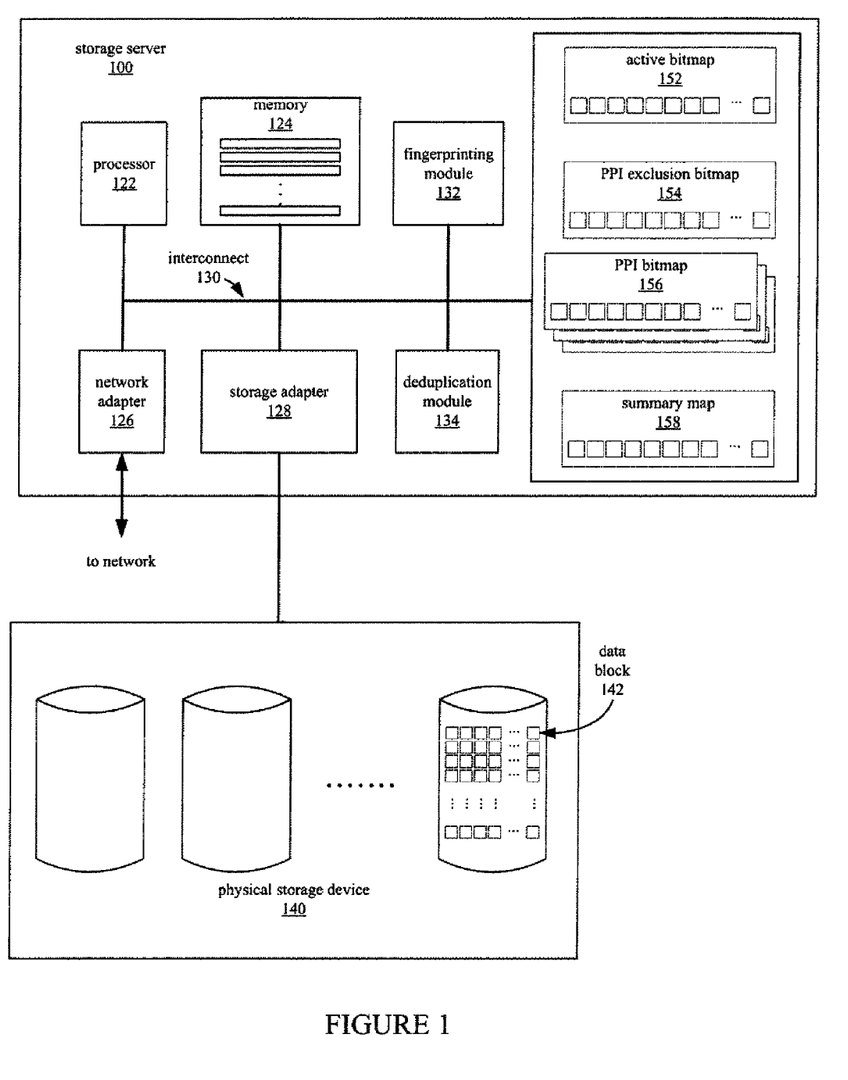
FIG. 1 is a block diagram illustrating one embodiment of a data storage system.

FIG. 1 illustrates one embodiment of a data storage system in which a PPI creation process that uses a PPI exclusion bitmap is implemented. Data storage system 160 includes a storage server 100, and at least one physical storage device 140.

A PPI exclusion bitmap allows for the exclusion of unwanted data blocks from a PPI and reduces the amount of storage space used by the PPI without a need for modifying the PPI after the PPI has been created. The PPI exclusion bitmap is also easily integrated into a PPI creation process that uses bitmaps for identifying characteristics of data blocks in the data set.

The storage server 100 includes a processor 122, a memory 124, a network adapter 126, and a storage adapter 128, which are coupled to each other via an interconnect 130. In one embodiment, the storage server 100 is within a network and the network adapter 126 interfaces with the network (not shown) to communicate with clients connected to the network. The network includes a local area network (LAN), or a wide area network (WAN), etc. Data is transmitted between the storage server 100 and the network via the network adapter 126. When data is received, the network adapter 126 forwards the data to the storage adapter 128, the memory 124, or the processor 122.

The storage server 100 is connected to at least one physical storage device 140, and may also be connected to any number of additional storage devices making up a local storage subsystem. For example, the physical storage device 140 may be a data storage device, such as a hard disk drive, or may also be a Redundant Array of Inexpensive Disks (RAID).

The physical storage device 140 stores data in data blocks, which are organized using buffer trees. The use of buffer trees to organize data blocks is further described with reference to FIG. 2 below. In one embodiment, the data blocks each contain 4 kb of data. In alternative embodiments, the data blocks may contain different amounts of data. The local storage subsystem of the storage server 100 includes the data storage devices accessible to the storage server 100.

In one embodiment, the storage server 100 of FIG. 1 has a distributed architecture. For example, the storage server 100 may include a separate N- ("network") blade and D- (disk) blade (not shown). In such an embodiment, the N-blade is used to communicate with clients connected to the network, while the D-blade includes the file system functionality and is used to communicate with the physical storage device 140. The N-blade and D-blade communicate with each other using an internal protocol. Alternatively, the storage server 100 may have an integrated architecture, where the network and data components are all contained in a single unit. The storage server 100 further may be coupled through a switching fabric to other similar storage servers (not shown) which have their own local storage subsystems. In this way, all of the storage subsystems form a single storage pool, to which any client of any of the storage servers has access.

In one embodiment, the processor 122 reads instructions from the memory 124 and executes the instructions. The memory 124 may include any of various types of memory devices, such as, for example, random access memory (RAM), read-only memory (ROM), flash memory, one or more mass storage devices (e.g., disks), etc. In one embodiment, the memory 124 stores instructions of various software running on the storage server 100, such as a Redundant Array of Inexpensive Disks (RAID) engine, an operating system, storage subsystems (e.g., driver of disk drives, driver of tape drives, etc.), Network File System (NFS) applications, Network Internet Protocol (IP) Driver, etc. The processor 122 responds to requests from client machines, the network management station, or other storage servers and organizes data on the storage devices (e.g., disks) coupled to the storage server 100. The storage server 100 interfaces with the storage devices via the storage adapter 128.

In one embodiment, storage server 100 also includes a fingerprinting module 132, a deduplication module 134, and a set of bitmaps 152, 154, 156, and 158. The set of bitmaps includes an active bitmap 152, a PPI exclusion bitmap 154, a PPI bitmap 156, and a summary map 158. Those of ordinary skill in the art will recognize that modules 132 and 134 may be implemented, for example, in a software-executing general purpose processor, hardware or firmware.

The deduplication module 134 performs a deduplication process for reducing the number of duplicate data blocks in a data set. A duplicate data block contains the same data in the data set.

For example, files and their corresponding data blocks may be duplicated by certain activities, such as emailing attachments to a number of contacts. In this case, a copy of the attached file is stored for each recipient of the file, and each copy of the file includes data blocks identical to each other copy of the file. In one embodiment, a file is defined by a collection of pointers referencing the data blocks that are included in the file. Thus, the each of the duplicate files may reference different sets of data blocks, where the sets of data blocks are duplicates of each other.

The deduplication process performed by the deduplication module 134 decreases the amount of space used to store the duplicate files by updating the pointers for each duplicate file. In one embodiment, the deduplication process changes the pointers of one duplicate file so that the pointers reference the same data blocks that are referenced by another duplicate file. This results in each of the duplicate files referencing the same set of data blocks.

In one embodiment, files may share only some of their data blocks with other files. For example, a file having eight data blocks may have only two data blocks that are identical to two data blocks in another file. The deduplication process updates the file pointers so that the files share only the two identical data blocks.

In cases where the same data is repeated within a single file, the deduplication module 134 also updates file pointers of the same file to reference the same data block. The deduplication module also deallocates copies of data blocks that are no longer referenced by a file, so that new data can be stored on these data blocks.

In one embodiment, the deduplication module 134 tracks the number of file pointer references to each data block in a data set. This information is stored in a reference count file.

In one embodiment, the reference count file includes a number associated with each data block in the data set for which reference counts are tracked. For example, the reference count file may include 8 bits of reference count data for each data block, so that a reference count limit of up to 255 references to each data block can be counted. Those of ordinary skill in the art will recognize that in another embodiment, the reference count is not limited to 8 bits or 255 references.

In one embodiment, each time the deduplication module 134 updates a file pointer to reference a data block, the deduplication module updates the reference count file to increment the reference count associated with the data block. For example, the deduplication module 134 updates a file pointer to reference data block A, which is already referenced by 2 other file pointers. Accordingly, the deduplication module 134 increments the reference count for data block A from 2 to 3.

If increasing the reference count would exceed the reference count limit (i.e., 255 for an 8-bit reference count), a new duplicate data block B is created and referenced instead of updating the file pointer to reference data block A.

When a file pointer is updated so that it no longer references a data block, the reference count for the data block is decremented. When the reference count for a data block reaches zero, the data block is no longer a part of any file, and is deallocated.

Thus, the deduplication module 134 reduces the storage space occupied by duplicate data blocks by allowing data blocks to be shared among files, and within the same file.

The deduplication module 134 identifies data blocks that are duplicates by comparing fingerprints of data blocks. If the deduplication module 134 identifies data blocks with matching fingerprints, the deduplication module 134 performs more intensive comparisons to verify that the data blocks are identical. In one embodiment, another intensive comparison includes a comparison of the actual data blocks instead of fingerprints.

In one embodiment, fingerprints of data blocks are generated by the fingerprinting module 132. The fingerprinting module 132 generates a fingerprint of a data block by compiling; metadata related to the data block. For example, the fingerprint may include a checksum of the data block (which is automatically calculated by a Redundant Array of Independent Disks (RAID) system that is a computer data storage scheme that can divide and replicate data among multiple hard disk drives), an inode identifier, a file block number, or other metadata related to the data block.

In one embodiment, the fingerprinting module 132 is implemented as a software-executing general processor module. Alternatively, the fingerprinting module 132 may be implemented as a hardware module. For example, the functions of the fingerprinting module 132 may be performed by circuitry in a peripheral component interconnect (PCI) card.

In one embodiment, when a data block 142 is written to the physical storage device 140, the fingerprinting module 132 generates a fingerprint for the data block 142 and stores the fingerprint in a changelog file. The deduplication module 134 checks the changelog file and compares the fingerprints of the new data blocks with the fingerprints of other data blocks in the data storage system determine if any of the new data blocks are duplicates of other data blocks.

If the deduplication module 134 identifies data blocks with matching fingerprints, the deduplication module 134 performs a bitwise comparison of the data blocks. In one embodiment, the bitwise comparison proceeds sequentially through all the bits in the data blocks. Alternatively, the deduplication module 134 compares bits in the data blocks according to a pattern (i.e., every $1000^{th}$ bit is compared) or an arbitrary sequence.

The changelog file is likely to change frequently, since it is updated whenever a new data block is written or whenever the deduplication process is performed. Thus, the changelog file is likely to be captured by an incremental backup or PPI creation process that only captures data that has changed since the last backup or PPI was created. Therefore, in one embodiment, files such as the changelog file are excluded by a PPI creation process that uses a set of bitmaps to determine which data blocks to include or exclude from a new PPI.

In one embodiment, a bitmap includes a sequence of bits, where each bit corresponds to a data block in a data set, such as a LUN. Each bit in a bitmap may be asserted (e.g., set to 1) or deasserted (e.g., set to 0). Whether a bit is asserted or deasserted indicates some characteristic about the data block associated with the bit. In alternative embodiments, the meanings of the 1 or 0 bits may be reversed.

The bitmaps in storage server 100 include an active bitmap 152, a PPI exclusion bitmap 154, a PPI bitmap 156, and a summary map 158. In addition to PPI bitmap 156, the storage server 100 also includes additional PPI bitmaps. In alternative embodiments, one or more of the bitmaps are stored at a remote location accessible to storage server 100, rather than within the storage server 100 itself.

In one embodiment, a storage server maintains an active bitmap associated with a data set, which indicates which data blocks in a data set are allocated to files. Thus, the active bitmap reflects the current allocation state of data blocks in the active file system. The PPI creation process uses the active bitmap when creating a PPI of the data set to determine which data blocks to include in the PPI. The PPI creation process thus conserves storage space used by the PPI by avoiding the inclusion of unallocated data blocks.

The active bitmap 152 includes a set of active bits that identify data blocks that are allocated to files in an active file system. The active file system contains the files normally accessible to clients and users in the normal course of operation of the storage server.

In active bitmap 152, an 1 bit indicates that a data block corresponding to the bit is allocated to a file in the active file system. A 0 bit indicates that the data block corresponding to the bit is deallocated, or is not allocated to a file in the active file system.

In addition to the active bitmap, the storage server also maintains a PPI exclusion bitmap. The PPI exclusion bitmap identifies data blocks in the data set that are allocated to files, but are not to be included in a PPI of the data set. In one embodiment, the PPI exclusion bitmap is associated with a file exclusion list. The file exclusion list identifies excluded files, such as system files or temporary files, that are to be excluded from a PPI. The file exclusion list may be generated by the system for commonly transient data. For example, the unwanted files can automatically include compiler generated temporary files which get deleted after compilation, temporary fingerprint and changelog metadata, file system temporary scratch area. Furthermore, an administrator is able to define and add specific files to the file exclusion list. For example, the administrator can specify that files included in a temporary folder are to be excluded. The storage server maintains the PPI exclusion bitmap by asserting bits in the PPI exclusion bitmap to identify data blocks allocated to the excluded files.

The PPI exclusion bitmap 154 includes a set of exclusion bits that identify data blocks to be excluded from a PPI image. In one embodiment, the data blocks identified in the PPI exclusion bitmap 154 are allocated to files in a file exclusion list.

In PPI exclusion bitmap 154, an exclusion bit set to 1 indicates that a data block corresponding to the bit should be excluded from a PPI. An exclusion bit set to 0 indicates that the corresponding data block is either not allocated to a file in the active file system, or is allocated and should not be excluded from a PPI.

In one embodiment, a storage server uses the PPI exclusion bitmap to exclude a system metadata file such as a changelog file from a PPI. The changelog file, which is used by a deduplication process to identify duplicate data blocks, is likely to change whenever data blocks are written or the deduplication process is run. The changelog file is thus likely to be captured by an incremental backup or PPI creation process. Thus, in a storage server that implements deduplication, the amount of storage space used by each PPI can be reduced by excluding files such as the changelog file from the PPIs.

The PPI bitmap 156 is associated with an existing PPI and identifies data blocks that are included in the PPI. The PPI bitmap 156 includes a set of PPI bits, where each of the PPI bits is associated with a data block in the data set. Each PPI bit is 1 if its corresponding data block is included in the PPI associated with the PPI bitmap 156.

In one embodiment, a PPI is created by generating a PPI bitmap, which locks data blocks by including them in the PPI. The locked data blocks in the PPI are protected from modification to preserve the integrity of the PPI.

Summary map 158 is associated with a set of PPIs. The summary map 158 includes a set of summary bits, each associated with a data block in the data set. Each of the summary bits is 1 if the corresponding data block is included in at least one of the PPIs in the set of PPIs associated with the summary map. The summary map is generated by performing a logical OR of a set of PPI bitmaps.

In one embodiment, the PPI creation process creates a new PPI including data blocks allocated to files in the active file system, excluding data blocks of files in a file exclusion list, and excluding data blocks that are already locked in an existing PPI. The bitmaps 152, 154, 156, and 158 are used in the PPI creation process to determine which data blocks to include or exclude from the new PPI.

When a PPI is being created, the PPI creation process identifies data blocks to be included in a PPI by performing simple operations on the active bitmap and the PPI exclusion bitmap. For example, the bits in the active bitmap ("active bits") are set to 1 if their corresponding data blocks are allocated to files. The bits in the PPI exclusion bitmap ("exclusion bits") are set to 1 if their corresponding data blocks are allocated to files in the file exclusion list. Thus, the PPI creation process subtracts the PPI exclusion bitmap from the active bitmap, resulting in a PPI bitmap that identifies the data blocks included in the PPI.

Data blocks identified by the PPI bitmap are then "locked" in the PPI. These locked data blocks are prevented from being overwritten until the PPI is deleted. In one embodiment, the data blocks may be shared between two data sets, such as a LUN in the active file system and a PPI of the LUN. For example, the data blocks that are locked in the PPI are also accessible as part of the active file system. For example, if a client accesses a file in the active file system that has not changed since the creation of the PPI, the data blocks accessed by the client may be the same data blocks that are locked in the PPI.

Figure 2:
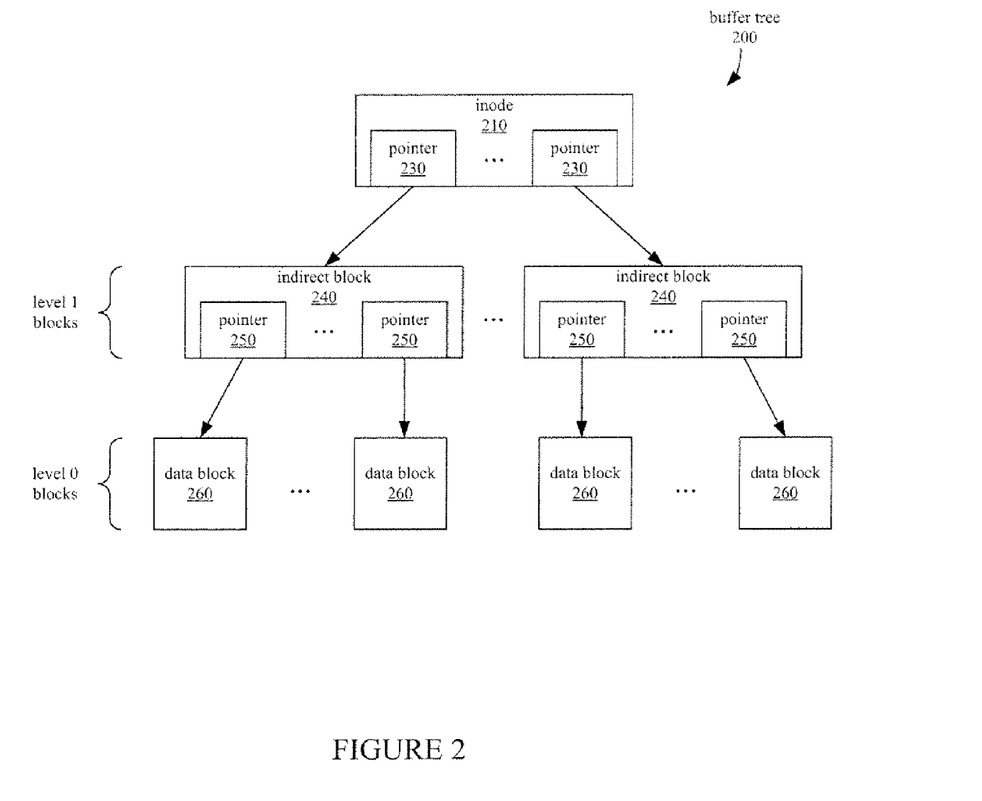
FIG. 2 illustrates a buffer tree, according to one embodiment.

FIG. 2 illustrates one embodiment of a buffer tree used to organize data blocks on a physical storage device 140, or on a local storage subsystem. A buffer tree is a logical representation of the data blocks for a file. A buffer tree such as buffer tree 200 is used by storage server 100 to organize data blocks on physical storage device 140. Each buffer tree has an inode 210 at its root (top-level). An inode 210 is a data structure used to store information, such as metadata, about the file, whereas the data blocks are structures used to store the actual data for the file. The information contained in an inode 210 includes, for example, ownership of the file, access permission for the file, size of the file, file type and references to locations on disk of the data blocks for the file.

The references to the locations of the file data are provided by pointers 230 in the inode 210, which points to indirect blocks 240 (also called "Level 1 blocks" or "L1 blocks"). The indirect blocks 240 contain pointers 250 that reference the actual data blocks 260 (also called "Level 0 blocks" or "L0 blocks"), depending upon the quantity of data in the file. Each pointer 230 or 250 is embodied as a virtual block number (VBN) to facilitate efficiency among the file system and the RAID system when accessing the data on disks.

Note that there may be additional levels of indirect blocks (e.g., level 2, level 3) depending upon the size of the file. That is, the data of the file are contained in direct (L0) blocks 260 and the locations of these blocks are stored in the indirect (L1) blocks 240 of the file. In one embodiment, each indirect block 240 can contain pointers to as many as 1,024 direct blocks. According to the "write anywhere" nature of the file system, these blocks may be located anywhere in the local storage subsystem. The logical (sequential) position of a direct (L0) block 260 within a file is indicated by the block's file block number (FBN).

Figure 3:
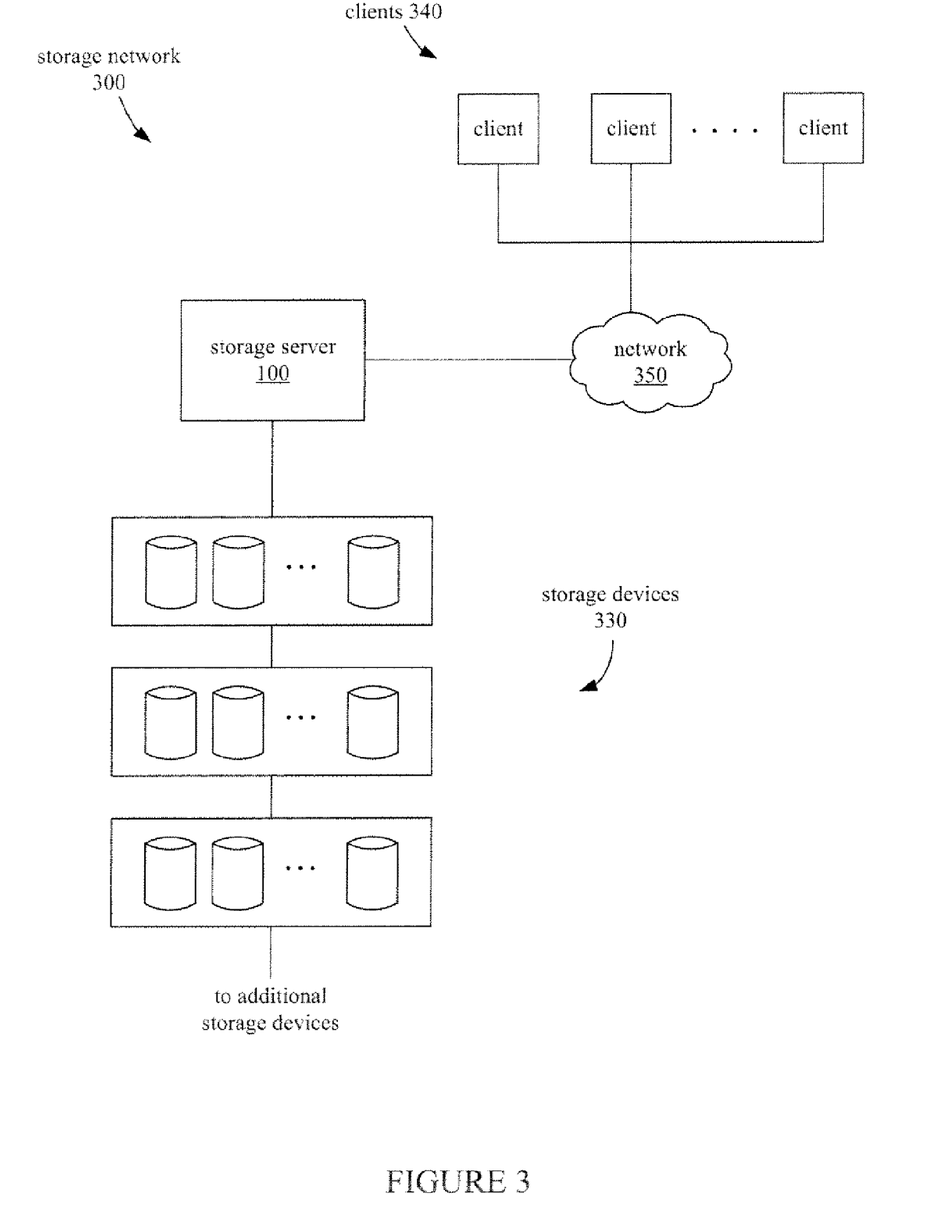
FIG. 3 illustrates one embodiment of a storage network.

FIG. 3 illustrates one embodiment of a storage network 300 in which a storage server 100 is used. The storage network 300 includes a storage server 100, a network 350, a number of storage devices 330 coupled to the storage server 100, and a number of client machines 340 coupled to the storage server 100 via the network 350. The network 350 may include a wide area network (WAN), a local area network (LAN), etc. The storage devices 330 may include a number of disks organized in shelves. The disks may include one or more Redundant Array of Independent Disks (RAID) volumes.

Note that any or all of the components of storage network 300 and associated hardware may be used in various embodiments. However, it can be appreciated that other configurations of the data storage system may include some or all of the devices disclosed above.

In one embodiment, the storage network 300 includes a storage area network (SAN) to transmit read/write requests at the block level of the storage server 100. A block is the basic unit used to store data in the SAN. In an alternative embodiment, the storage network 300 is a network-attached storage (NAS) system that transmits data at the file level. In the NAS system, complete files are retrieved instead of segments on a disk. The NAS system uses file access protocols to retrieve data, such as, for example, Network File System (NFS), or Common Internet File System (CIFS). The SAN and the NAS systems may be implemented in a single server or in separate servers. In one embodiment, the storage server 100 performs a PPI creation process for backing up data stored on storage devices 330.

Figure 4:
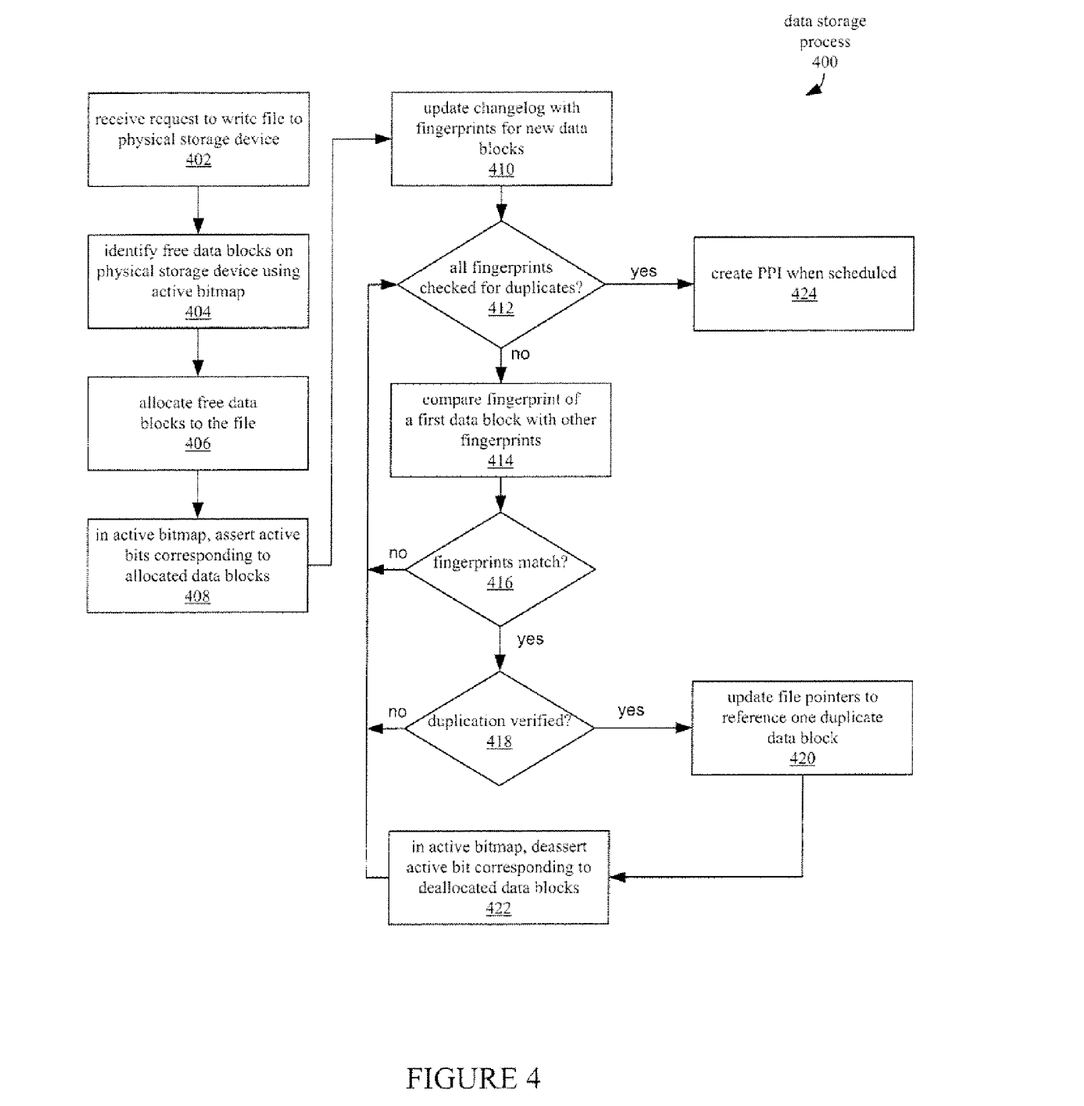
FIG. 4 is a flow chart illustrating a process for writing data blocks to a data set, according to one embodiment.

FIG. 4 illustrates a process for storing a data block to a physical storage device, according to one embodiment. Data storage process 400 may be executed by a storage server, such as storage server 100, to store a data block to a physical storage device 140 or a set of storage devices 330.

At block 402, the data storage process 400 receives a request to write a file to the physical storage device 140. For example, with reference to FIG. 3, one of the clients 340 sends a file to storage server 100 through network 350, with a request to store the file on storage devices 330. The file is received at network adapter 126. In other embodiments, clients request that individual data blocks be stored on the physical storage device 140 or a set of storage devices 330, rather than a file. This may be the case when a storage server is configured to provide block-level access to data, rather than file-level access.

At block 404, the data storage process 400 identifies free data blocks on the physical storage device 140 using active bitmap 152. As described above with reference to FIG. 1, the 1 bits in active bitmap 152 correspond to data blocks that have already been allocated to other files. Thus, the process 400 locates free data blocks by finding data blocks corresponding to 0 bits in the active bitmap.

At block 406, the data storage process 400 allocates the free data blocks 142 of physical storage device 140 to the file, and the data for the file is stored in the free data blocks.

At block 408, the data storage process 400 updates the active bitmap 152 by asserting the bits in the active bitmap 152 that correspond to the data blocks allocated to the file. Specifically, the active bits corresponding to the newly allocated data blocks are set to 1 to indicate that these data blocks are now allocated to a file.

At block 410, the data storage process 400 stores in a changelog fingerprints for data blocks allocated to the file. The fingerprints for the data blocks are generated by fingerprinting module 132. The fingerprints from the fingerprinting module 132 are stored in the changelog, which in one embodiment is a file. Alternatively, the changelog may be a database or some other data object. In one embodiment, the changelog stores fingerprints for data blocks allocated over a certain period of time. For example, the changelog may contain fingerprints for data blocks allocated since the last execution of a deduplication process.

At block 412, the data storage process 400 determines whether each of the fingerprints stored in the changelog file have been checked for duplicates. The operations of block 412 are performed as part of a deduplication process, by deduplication module 134. If each of the fingerprints in the changelog has already been checked to verify that the recently written data blocks are not duplicates of other data blocks in the data set, the process 400 proceeds to block 426. If not all of the fingerprints in the changelog file have been processed, the process 400 proceeds to block 414.

At block 414, the next unprocessed fingerprint in the changelog file is compared with the fingerprints of other data blocks in the data set. The deduplication module 134 identifies matching fingerprints by performing a bitwise comparison of the fingerprints.

At block 416, if the fingerprint from the changelog file does not match any other fingerprint of a data block in the data set, the process 400 continues processing the remaining unprocessed fingerprints in the changelog file through the repeated execution of blocks 412, 414, and 416. If the process 400 identifies two or more data blocks having matching fingerprints, the process 400 proceeds to block 418.

At block 418, the process 400 verifies that the data blocks with matching fingerprints are duplicates. This part of the process 400 is performed by the deduplication module 134, which compares actual data stored in the data blocks. For example, the deduplication module 134 may perform a sequential bitwise comparison of the data blocks. In one embodiment, the deduplication module 134 may also compare selected bits of the data blocks, such as every $100^{th}$ bit, or every $1000^{th}$ byte. If the data blocks are not actual duplicates, the deduplication module 134 continues processing the remaining unprocessed fingerprints in the changelog through the repeated execution of blocks 412, 414, and 416. If the data blocks are actual duplicates, the process 400 proceeds to block 420.

At block 420, the data storage process 400 updates file pointers to reference one of the duplicate data blocks. For example, if two files separately reference one of two duplicate data blocks, the file pointers are updated so that both files reference the same data block. The data block that is no longer referenced by either of the files is deallocated.

At block 422, the bits in the active bitmap 152 that correspond to the deallocated data blocks are set to 0. This indicates that the data blocks are no longer allocated to any files in the active file system. The process 400 continues to block 412, where blocks 412, 414, 416, and 418 are repeated to process the remaining fingerprints in the changelog.

The process 400 proceeds to block 424 when all the fingerprints in the changelog file have been processed. At block 424, a PPI is created at the next scheduled time for creation of a new PPI, as described next.

Figure 5:
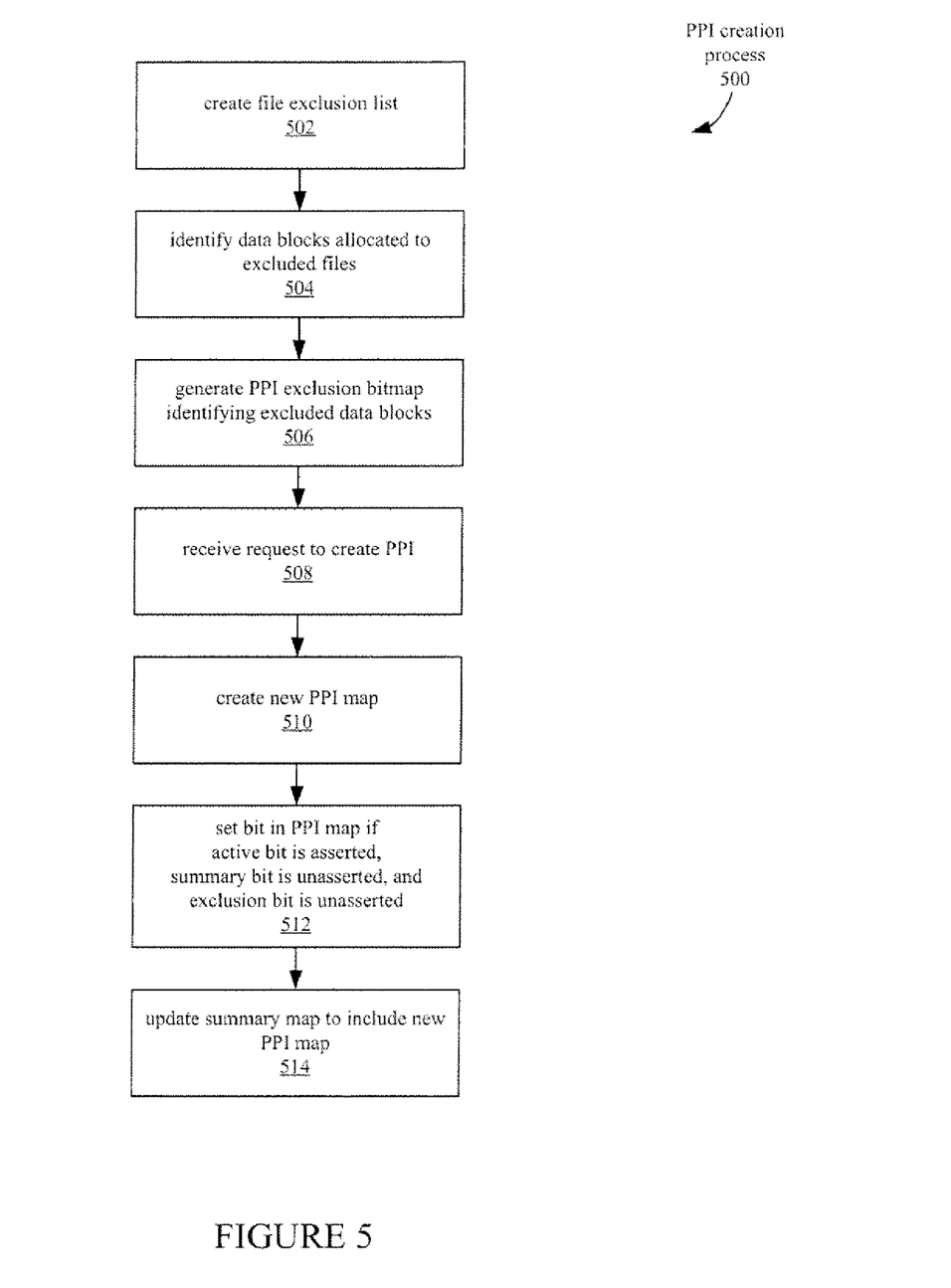
FIG. 5 illustrates a process for creating a PPI, according to one embodiment.

FIG. 5 illustrates a process for creating a PPI, according to one embodiment. PPI creation process 500 may be executed by a storage server, such as storage server 100, to create a PPI for a data set stored on a local storage subsystem, such as physical storage device 140 or storage devices 330. FIG. 5 is described with reference to FIGS. 6-8.

The PPI creation process 500 uses a set of bitmaps to determine which data blocks to include in a new PPI. These bitmaps include the active bitmap 152, the PPI exclusion bitmap 154, and a PPI map 156 or summary map 158. As shown in FIG. 1 and described above, these bitmaps are maintained by storage server 100. The active bitmap 152 is maintained by the operations represented in blocks 408 and 424 of data storage process 400, as shown in FIG. 4. In one embodiment, the PPI exclusion bitmap 154, PPI map 156, and summary map 158 used by PPI creation process 500 are created or maintained by prior invocations of the PPI creation process 500.

Returning to FIG. 5, at block 502, a file exclusion list is created. The file exclusion list identifies files to be excluded from a PPI, and is implemented as a file or database that identifies excluded files by their locations or aliases.

Figure 6:
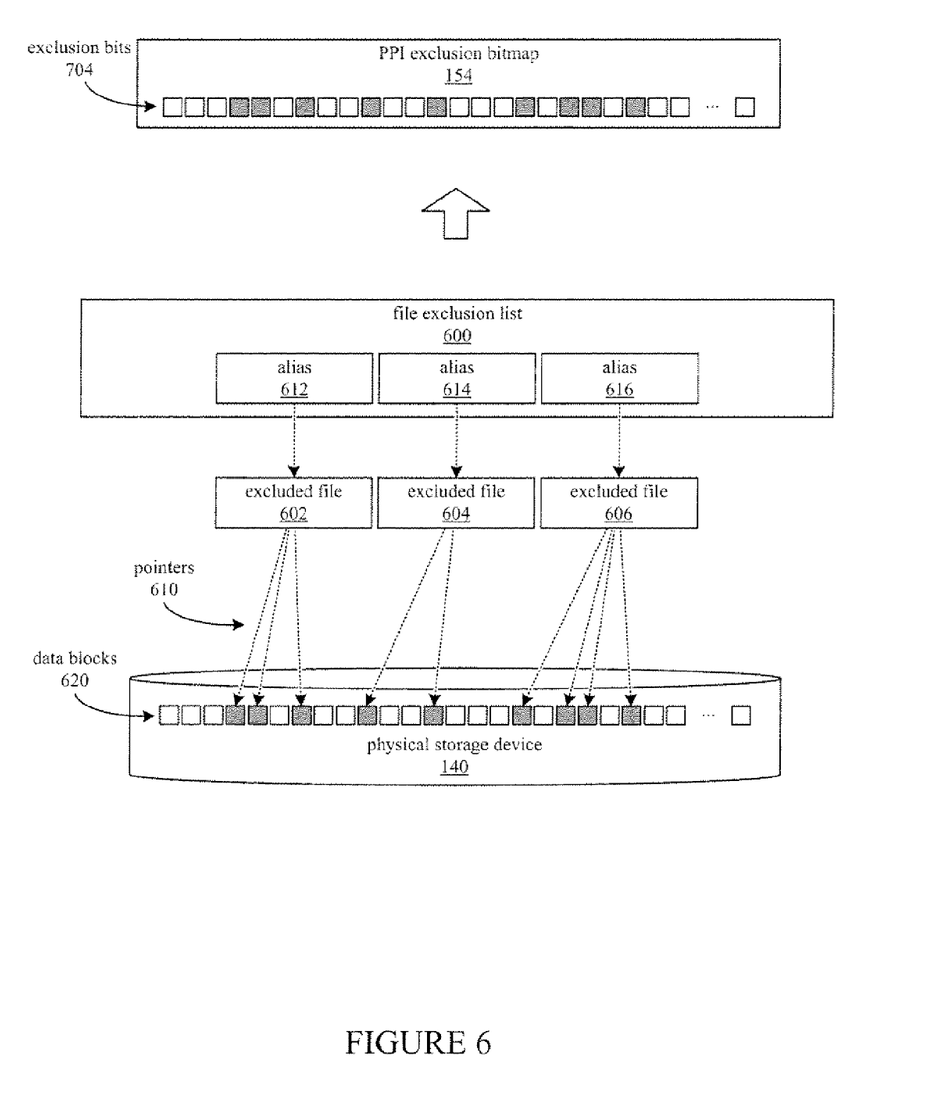
FIG. 6 illustrates a file exclusion list, according to one embodiment.

FIG. 6 illustrates relationships between a file exclusion list 600, a PPI exclusion bitmap 154, and data blocks 620 on a physical storage device 140. In the embodiment illustrated, file exclusion list 600 identifies files 602, 604, and 606 as excluded files using aliases 612, 614, and 616, respectively. Excluded files 602, 604, and 606 reference data blocks in physical storage device 140 using file pointers 610. Each of the file pointers 610 identifies one of the data blocks 620 as included in one of the excluded files 602, 604, or 606.

Returning to FIG. 5, at block 504, the PPI creation process 500 identifies data blocks that are allocated to excluded files. In one embodiment, the process 500 identifies these data blocks based on the file exclusion list. Particularly, the process 500 identifies the excluded files 602, 604, and 606 from the aliases 612, 614, and 616 in the file exclusion list 600, and uses the pointers 610 associated with the excluded files 602, 604, and 606 to determine which of the data blocks 620 are allocated to excluded files 602, 604, and 606.

Figure 7:
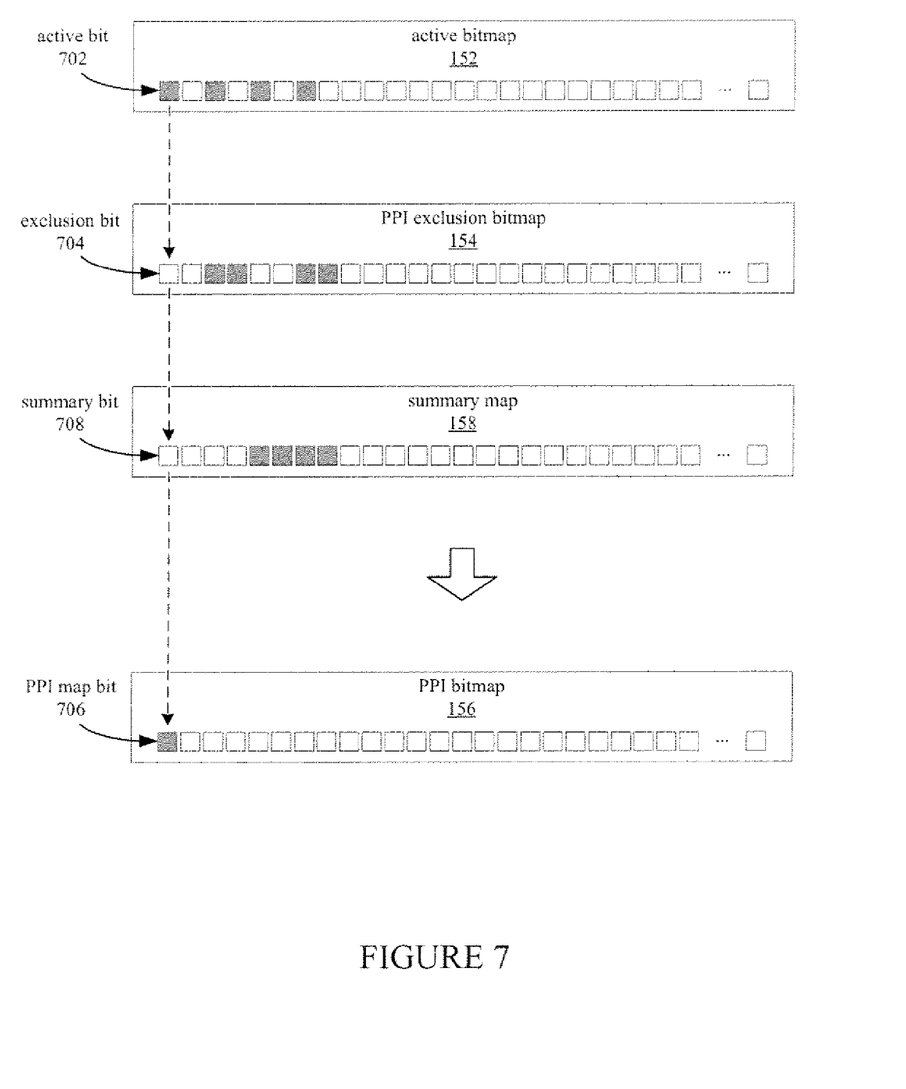
FIG. 7 illustrates bitmaps used by a PPI creation process, according to one embodiment.

At block 506, the process 500 generates a PPI exclusion bitmap 154 identifying the excluded data blocks. Each of the exclusion bits 704 in the PPI exclusion bitmap 154 corresponds to one of the data blocks 620. Each exclusion bit in the PPI exclusion bitmap 154 is set to 1 if its corresponding data block 620 is allocated to one of the excluded files 602, 604, or 606. In one embodiment, the PPI exclusion bitmap 154 is updated whenever one of the excluded files 602, 604, or 606 is modified.

Returning to FIG. 5, at block 508, the storage server 100 receives a request to generate a PPI for the data set. For example, the storage server 100 may be configured to generate a new PPI at periodic intervals. Alternatively, the request to create a PPI may be received from a client, or initiated by a user or administrator of the storage server 100.

At block 510, a new PPI bitmap 156 is created in response to the request to generate a new PPI. The PPI bitmap 156 includes a PPI bit for each data block in the data set for which the PPI is being created. Each of the PPI bits in the PPI bitmap 156 is set to 1 if its corresponding data block is included in the new PPI. The PPI creation process 500 determines which data blocks are to be included in the new PPI using the active bitmap 152, the PPI exclusion bitmap 154, and the summary map 158.

At block 512, the process 500 asserts or deasserts bits in the new PPI bitmap 156 based on the active map, the PPI exclusion bitmap 154, and the summary map 158.

FIG. 7 illustrates a process for creating a PPI bitmap 156 based on an active bitmap 152, a PPI exclusion bitmap 154, and a summary map 158. Each PPI map bit in PPI bitmap 156 is 1 if the corresponding active bit in active bitmap 152 is 1, the corresponding exclusion bit in PPI exclusion bitmap 154 is 0, and the corresponding summary bit in summary map 158 is 0. For example, the PPI map bit 706 corresponds to active bit 702, exclusion bit 704, and summary bit 706. Since active bit 702 is 1 and exclusion bit 704 and summary bit 708 are 0, PPI map bit 706 is 1. When the corresponding active bit, exclusion bit, and summary bit for a PPI map bit are not 1, 0, and 0, respectively, the PPI map bit is 0. The new PPI bitmap thus indicates which data blocks in the data set are included in the new PPI.

Figure 8:
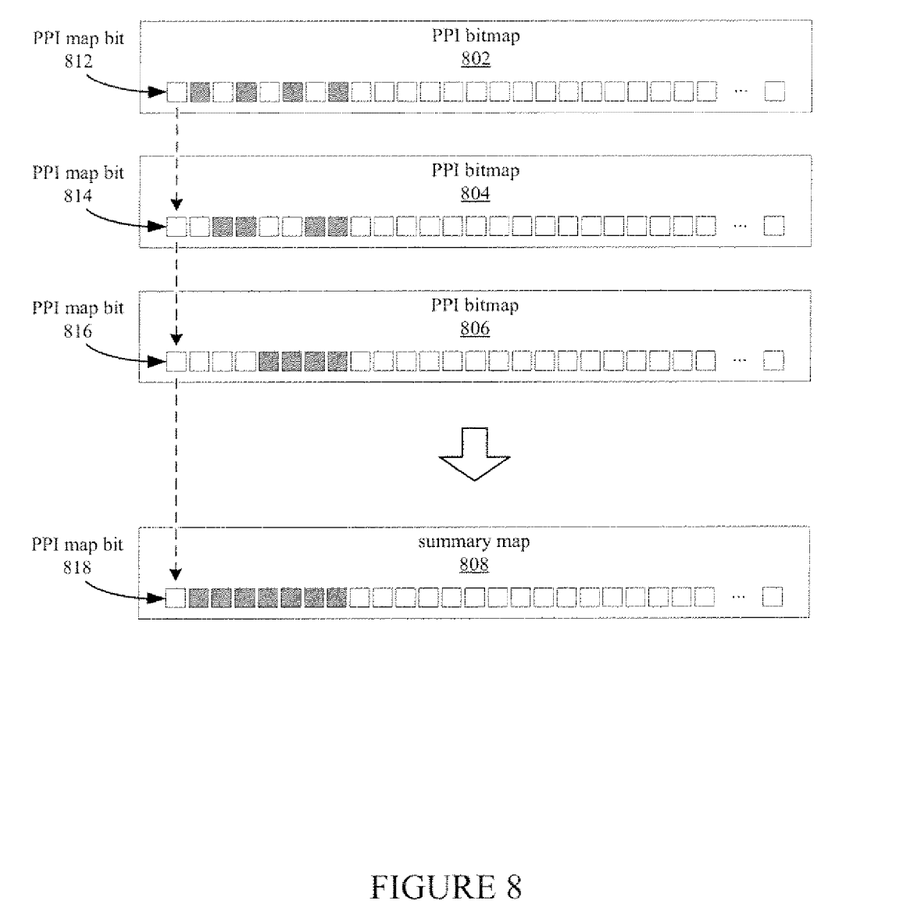
FIG. 8 illustrates a summary map, according to one embodiment.

Returning to FIG. 5, at block 514, the summary map is updated to reflect the status of data blocks included in the new PPI. Summary map 808 includes a summary bit corresponding to each data block in a data set associated with the summary map 808. Each summary bit indicates whether its corresponding data block has been included in a PPI.

FIG. 8 illustrates the creation of a summary map 808 from a number of PPI bitmaps 802, 804, and 806. The PPI bitmaps are each associated with a PPI image of the same data set. The summary map 808 is created by performing a bitwise logical OR of the PPI bitmaps 802, 804, and 806. For example, since none of PPI map bits 812, 814, or 816 is 1, the corresponding summary bit 818 is not 1. For each summary bit, the summary bit is 1 if a corresponding PPI map bit in any of the PPI bitmaps 802, 804, or 806 is also 1.

Alternatively, an updated summary map can be created by similarly performing a bitwise logical OR between the existing summary map 158 and the new PPI bitmap 156.

Embodiments of the present invention allow the exclusion of specific data blocks from a persistent point-in-time image. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

It will be appreciated that certain embodiments of the present invention may be implemented with sold-state memories including flash storage devices constituting storage device 140. For example, storage device 140 may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used.

When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

Moreover, the description of FIGS. 2 and 3 is intended to provide an overview of computer hardware and other operating components suitable for performing the methods of the invention described above, but is not intended to limit the applicable environments. One of ordinary skill in the art will immediately appreciate that the invention can be practiced with other computer system configurations. The invention can also be practiced in distributed computing environments where tasks are performed by remote processing devices that are linked through a communications network.

It will be readily apparent to one of ordinary skill in the art, that input/output devices, such as a keyboard, a pointing device, and a display, may be coupled to the storage server. These conventional features have not been illustrated for sake of clarity.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions.

The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems (e.g., Write Anywhere File Layout (WAFL) system provided by NetApp, Inc. of Sunnyvale, Calif.). In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the method illustrated in FIGS. 4 and 5 without departing from the scope of the invention and that no particular order is implied by the arrangement of blocks shown and described herein.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Therefore, it is manifestly intended that this invention be limited only by the following claims and equivalents thereof.

What is claimed is:

1. A data storage system, comprising:
  a processor;
  a physical storage device containing a data set comprising a plurality of data blocks; and
  a memory coupled with the processor, wherein the memory stores:
    a plurality of bitmaps comprising a plurality of bits, each of the plurality of bits are either asserted or deasserted,
    a plurality of persistent point-in-time image (PPI) bitmaps comprising a plurality of PPI map bits, each of the plurality of asserted PPI map bits corresponding to a PPI data block,
    a summary bitmap comprising a plurality of summary bits, each asserted summary bit corresponding to an asserted PPI map bit in one of the plurality of PPI bitmaps,
    an active bitmap comprising a plurality of active bits, each asserted active bit corresponding to a data block allocated to a file,
    an exclusion bitmap comprising a plurality of exclusion bits, each asserted exclusion bit corresponding to a data block to be excluded from a PPI bitmap of the data set; and
    instructions that, when executed by the processor, cause the processor to:
      compute a fingerprint for each of the plurality of data blocks from metadata related to the plurality of data blocks,
      store the fingerprint in a changelog file excluded from the PPI bitmap,
      compare a fingerprint of a first data block with a fingerprint of a second data block to determine whether the first data block and the second data block are duplicates,
      select one of the first data block and the second data block if one of the first data block and the second data block is a duplicate data block,
      update a reference to one of first data block and the second data block, wherein updating the one of the first data block and the second data block deallocates the duplicate data block, wherein an active bit corresponding to a deallocated data block is deasserted in the active bitmap; and
      create a new PPI bitmap of the data set, the new PPI bitmap including a plurality of PPI data blocks, wherein each data block in the plurality of PPI data blocks corresponds to a deasserted summary bit of the summary bitmap, an asserted active bit of the active bitmap, and a deasserted exclusion bit of the exclusion bitmap.

2. The data storage system of claim 1, wherein the memory further stores a file exclusion list, wherein each data block referenced by an excluded file in the file exclusion list is associated with an asserted exclusion bit in the exclusion bitmap, and wherein the file exclusion list is automatically updated to include transient data.

3. The data storage system of claim 1, wherein a data block is allocated to a plurality of files.

4. The data storage system of claim 1, wherein data blocks identified by the plurality of PPI bitmaps are locked, and wherein locked data blocks are prevented from overwrites until the data block is unidentified with the plurality of PPI bitmaps.

5. The data storage system of claim 4, wherein an active file system and the plurality of PPI bitmaps have read access to the locked data blocks.

6. The data storage system of claim 1, wherein a deduplication module is configured to deallocate a duplicate data block.

7. A computer-implemented method, comprising:
  updating, in the storage server, a plurality of bitmaps comprising a plurality of bits, each of the plurality of bits are either asserted or deasserted;
  updating, in the storage server, a summary bitmap comprising a plurality of summary bits, each asserted summary bit corresponding to an asserted persistent point-in-time image (PPI) map bit in one of a plurality of PPI bitmaps;
  updating, in a storage server, an active bitmap comprising a plurality of active bits, each asserted active bit corresponding to a data block allocated to a file;
  updating, in the storage server, an exclusion bitmap comprising a plurality of exclusion bits, each asserted exclusion bit corresponding to a data block to be excluded from a PPI bitmap of a data set;

receiving, at the storage server, a request to create a new PPI bitmap of a data set; and in response to the request:

computing a fingerprint for each of the plurality of data blocks from metadata related to the plurality of data blocks, storing the fingerprint in a changelog file excluded from the PPI bitmap, comparing a fingerprint of a first data block with a fingerprint of a second data block to determine whether the first data block and the second data block are duplicates, selecting one of the first data block and the second data block if one of the first data block and the second data block is a duplicate data block, updating a reference to one of the first data block and the second data block, wherein updating the one of the first data block and the second data block deallocates the duplicate data block, wherein an active bit corresponding to a deallocated data block is deasserted in the active bitmap; and creating a new PPI bitmap of the data set, the new PPI bitmap including a plurality of PPI data blocks, wherein each data block in the plurality of PPI data blocks corresponds to a deasserted summary bit of the summary bitmap, an asserted active bit of the active bitmap, and a deasserted exclusion bit of the exclusion bitmap.

8. The computer-implemented method of claim 7, further comprising updating automatically, in the storage server, a file exclusion list to include transient data, wherein each data block referenced by an excluded file in the file exclusion list is associated with an asserted exclusion bit in the exclusion bitmap.

9. The computer-implemented method of claim 7, wherein a data block is allocated to a plurality of files.

10. The computer-implemented method of claim 7, wherein data blocks identified by the plurality of PPI bitmaps are locked, and wherein locked data blocks are prevented from overwrites until the data block is unidentified with the plurality of PPI bitmaps.

11. The computer-implemented method of claim 10, wherein an active file system and the plurality of PPI bitmaps have read access to the locked data blocks.

12. A storage server, comprising:

a processor;

a memory coupled with the processor, wherein the memory contains instructions that, when executed by the processor, cause the storage server to:

update a plurality of bitmaps comprising a plurality of bits, each of the plurality of bits are either asserted or deasserted;

update a summary bitmap comprising a plurality of summary bits, each asserted summary bit corresponding to an asserted persistent point-in-time image (PPI) map bit in one of a plurality of PPI bitmaps;

update an active bitmap comprising a plurality of active bits, each asserted active bit corresponding to a data block allocated to a file;

update an exclusion bitmap comprising as plurality of exclusion bits, each asserted exclusion bit corresponding to a data block to be excluded from a PPI bitmap of the data set;

receive a request to create a new PPI bitmap of a data set; and in response to the request:

computing a fingerprint for each of the plurality of data blocks from metadata related to the plurality of data blocks, storing the fingerprint in a changelog file excluded from the PPI bitmap, comparing a fingerprint of a first data block with a fingerprint of a second data block to determine whether the first data block and the second data block are duplicates, selecting one of the first data block and the second data block if one of the first data block and the second data block is a duplicate data block, updating a reference to one of the first data block and the second data block, wherein updating the one of the first data block and the second data block deallocates the duplicate data block, wherein an active bit corresponding to a deallocated data block is deasserted in the active bitmap; and creating the new PPI bitmap of the data set including a plurality of PPI data blocks, each data block in the plurality of PPI data blocks corresponding to a deasserted summary bit of the summary bitmap, an asserted active bit of the active bitmap, and a deasserted exclusion bit of the exclusion bitmap.

13. The storage server of claim 12, wherein data blocks identified by the plurality of PPI bitmaps are locked, and wherein locked data blocks are prevented from overwrites until the data block is unidentified with the plurality of PPI bitmaps.

14. The storage server of claim 12 wherein an active the system and the plurality of PPI bitmaps have read access to the locked data blocks.

15. The storage server of claim 12, wherein each of the plurality of PPI data blocks further corresponds to a deasserted PPI map bit in a pre-existing PPI bitmap.

16. The storage server of claim 12, wherein the memory further contains instructions that, when executed by the processor, cause the storage server to maintain a summary map, wherein the summary map includes an asserted summary bit corresponding to each of a plurality of data blocks associated with an asserted PPI map bit in one of a plurality of pre-existing PPI bitmaps, and wherein each of the plurality of PPI data blocks further corresponds to a deasserted summary bit in a summary map.

17. A computer-implemented method, comprising:

generating, at a storage server, a plurality of bitmaps comprising a plurality of bits, each of the plurality of bits are either asserted or deasserted;

generating, at a storage server, a summary bitmap comprising a plurality of summary bits, each asserted summary bit corresponding, to an asserted persistent point-in-time image (PPI) map bit in one of a plurality of PPI bitmaps;

generating, at the storage server, an active bitmap comprising a plurality of active bits, each asserted active bit corresponding to a data block allocated to a file;

generating, at the storage server, an exclusion bitmap comprising a plurality of exclusion bits, each asserted exclusion bit corresponding to a data block to be excluded from a PPI bitmap of a data set, receiving, at the storage server, a request to create a new PPI bitmap of a data set; and in response to the request:

generating a fingerprint for each of the plurality of data blocks from metadata related to the plurality of data blocks, storing the fingerprint in a changelog file excluded from the PPI bitmap,
comparing a fingerprint of a first data block with a fingerprint of a second data block to determine whether the first data block and the second data block are duplicates,
selecting one of the first data block and the second data block if one of the first data block and the second data block is a duplicate data block,
updating a reference to one of the first data block and the second data block, wherein updating the one of the first data block and the second data block deallocates the duplicate data block, wherein an active hit corresponding to a deallocated data block is deasserted in the active bitmap; and
generating a new PPI bitmap, the new PPI bitmap including a plurality of PPI data blocks, each data block in the plurality of PPI data blocks corresponding to a deasserted summary bit of the summary bitmap, an asserted active bit of the active bitmap, and a deasserted exclusion bit of the exclusion bitmap.

18. The computer-implemented method of claim 17, further comprising, generating automatically a file exclusion list to include transient data, wherein each data block referenced by an excluded file in the file exclusion list is associated with an asserted exclusion bit in the exclusion bitmap and wherein a data block may be associated with a plurality of files.

\* \* \* \* \*